(12) United States Patent
Ohta

(10) Patent No.: US 7,692,711 B2
(45) Date of Patent: Apr. 6, 2010

(54) IMAGE PICKUP APPARATUS

(75) Inventor: Seiya Ohta, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 11/297,072

(22) Filed: Dec. 8, 2005

(65) Prior Publication Data

US 2006/0132617 A1 Jun. 22, 2006

(30) Foreign Application Priority Data

Dec. 17, 2004 (JP) .............................. 2004-366035

(51) Int. Cl.
*G03B 13/00* (2006.01)
*G03B 3/00* (2006.01)
*H04N 5/232* (2006.01)
*H04N 5/225* (2006.01)

(52) U.S. Cl. ...................... 348/345; 348/349; 348/360; 396/79

(58) Field of Classification Search .............. 348/220.1, 348/375, 220, 345, 349, 355, 234, 348, 360; 396/79, 80, 82, 102, 121
See application file for complete search history.

(56) References Cited

U.S. PATENT DOCUMENTS

| | | | | |
|---|---|---|---|---|
| 4,484,806 A | * | 11/1984 | Onishi et al. ................ | 348/350 |
| 5,877,811 A | * | 3/1999 | Iijima et al. ................. | 348/375 |
| 6,236,431 B1 | * | 5/2001 | Hirasawa et al. ....... | 348/240.99 |
| 6,507,367 B2 | * | 1/2003 | Yasuda ....................... | 348/355 |
| 2001/0030707 A1 | | 10/2001 | Fujii | |
| 2002/0075396 A1 | | 6/2002 | Yasuda | |
| 2002/0109784 A1 | * | 8/2002 | Suda et al. .................. | 348/345 |
| 2003/0063211 A1 | | 4/2003 | Watanabe et al. | |
| 2003/0174231 A1 | * | 9/2003 | Yahagi et al. ............... | 348/345 |
| 2004/0119871 A1 | | 6/2004 | Nobuoka | |
| 2004/0130652 A1 | * | 7/2004 | Sasaki et al. ................ | 348/349 |

OTHER PUBLICATIONS

All of the above references were cited in a Dec. 4, 2008 European Search Report of the counterpart European Patent Application No. 05026841.6.

* cited by examiner

*Primary Examiner*—Nhan T Tran
*Assistant Examiner*—Mekonnen Dagnew
(74) *Attorney, Agent, or Firm*—Cowan, Liebowitz & Latman, P.C.

(57) ABSTRACT

In the case of a camera system capable of exchanging lenses, a camera can realize a preferable automatic focus adjustment performance even if an exchangeable lens, its lens state, different combination between lens and camera or image pickup state is changed by changing a frequency to be extracted by focus detection means in accordance with the identification information on the exchangeable lens.

9 Claims, 15 Drawing Sheets

| P0 | P1 | P2 | P3 | P4 | P5 | P6 | P7 | ... | $P_{n-2}$ | $P_{n-1}$ | $P_n$ |

FIG. 4A

| F0 | F1 | F2 | F3 | F4 | F5 | F6 | F7 | ... | $F_{n-2}$ | $F_{n-1}$ | $F_n$ |

FIG. 4B

| K0*F0 | K1*F1 | K2*F2 | K3*F3 | K4*F4 | K5*F5 | K6*F6 | K7*F7 | ... | $K_{n-2}*F_{n-2}$ | $K_{n-1}*F_{n-1}$ | $K_n*F_n$ |

FIG. 4C

| K6*F6 | K7*F7 | ... | $K_{n-2}*F_{n-2}$ |

FIG. 4D

| K1*F1 | K2*F2 | K3*F3 | K4*F4 | K5*F5 | K6*F6 | K7*F7 |

FIG. 4E

| K1*F1 | K2*F2 | K3*F3 | | | K6*F6 | K7*F7 | | $K_{n-1}*F_{n-1}$ | $K_n*F_n$ |

FIG. 4F

IMAGE PICKUP APPARATUS

BACKGROUND OF THE INVENTION

1. Field of the Invention

The present invention relates to an image pickup apparatus to which an exchangeable lens system is set and capable of picking up a still image and a moving image.

2. Related Background Art

A maximum power point tracking system is conventionally known as an automatic focus regulation system used for an image input unit such as a video camera.

This is a system for extracting a high frequency component in an image signal obtained from a solid-state image pickup device such as a CCD image pickup device, driving an image pickup lens so that the high frequency component is maximized and regulating a focal point.

This automatic focus regulation system does not require a special optical member for focus regulation and has an advantage of accurately brining into focus independently of a distance even for a distant place or near place.

A maxim-power-point-tracking-type automatic focus regulation system is briefly described below by referring to FIG. 19.

The light from an object enters the image pickup face (photoelectric conversion face) of an image pickup device 120 by passing through a fixed first lens group 110, second lens group 112 for variable power (hereafter referred to as variable power lens), aperture stop 114, fixed third lens group 116 and fourth lens group 118 (hereafter referred to as focusing lens) having a focus regulation function and a function for correcting movement of a focus face in accordance with variable power.

The image pickup device 120 converts an optical image on the image pickup face into an electrical signal.

An output signal for the image pickup device 120 is sample-held by a CDS circuit 122, amplified to a predetermined level by an AGC circuit 124 and converted into a digital signal by an A/D converter 126.

An output signal of the A/D converter 126 is supplied to a not-illustrated camera signal process circuit.

Because the process content of the camera signal process circuit is publicly known but it is not related with the present invention, further description thereof is omitted.

An output of the A/D converter 126 is also applied to a band-pass filter (BPF) 128.

The BPF 128 extracts a predetermined high-frequency component from the image data output from the A/D converter 126.

Every output of the BPF 128 is converted into a straight-polarity signal by an ABS circuit 130.

A gate signal generation circuit 132 generates a gate signal for designating a portion corresponding to the inside of a focus detection area in an image pickup screen.

A phase detector 134 phase-detects (for example, peak-holds or integrates) only a signal corresponding to the inside of the focus detection area from an output of the ABS circuit 130 in accordance with the gate signal.

The phase-detected signal is output at an interval synchronizing with integral multiples of a vertical sync signal as an AF (automatic focus regulation) evaluation value.

A main control circuit 136 constituted of a microcomputer captures an output (AF evaluation value) of the phase detector 134.

Focusing speed corresponding to a focusing degree and a motor driving direction according to an increment of AF evaluation value are decided based on the captured signal and a motor driving circuit 138 is controlled based on the decided result.

The motor driving circuit 138 drives a focus motor 140 in accordance with an instruction from the main control circuit 136 to move the focusing lens 118 to a designated position at a designated speed.

Thereby, the focusing lens 118 is controlled at a position where an output of the BPF 128 is maximized.

The main control circuit 136 also rotates a zoom motor 144 by a motor driving circuit 142 to move the variable power lens 112 up to a designated position in accordance with a variable power operation by a user.

Thereby, it is possible to change focal lengths and image pickup magnifications are changed.

FIG. 20 shows a flowchart of the maximum-power-point-tracking-type automatic focus regulation system by the main control circuit 136.

The main control circuit 136 continuously captures outputs (AF evaluation values) of the phase detector 134 at intervals synchronizing with integral multiples of a vertical sync signal to execute automatic focus regulation control.

When power supply is turned on or an image pickup preparation mode is started, AF return control is started (S1) and the focusing lens 118 is driven in a direction in which an AF evaluation value increases to perform the maximum power point tracking control (S2).

By overshooting and the returning the apex of a mountain (maximum point of power), the apex of the mountain is determined (S3) and stopped at a highest-level point to wait for restart (S4). When detecting that the level of the AF evaluation value lowers from the level at the time of stop, the AF return control is restarted (S5).

Moreover, in addition to a system for extracting a high-frequency component in an image signal by the BPF 128, a configuration of extracting a high-frequency component from a conversion result of a two-dimensional orthogonal converter used for image compression and using the component for automatic focus regulation is also proposed in recent years.

Furthermore, Japanese Patent Application Laid-Open No. H08-327893 discloses a moving focus regulator for excluding the influence of a spatial frequency of an object whose focus will be detected and always performing focus regulation in accordance with a best image face position without changing focus detection optical system.

The conventional maximum-power-point-tracking-type automatic focus regulation system is described above. In recent years, however, change in lenses to zoom and high magnification and change in image pickup means to high pixel and high density are accelerated for image pickup of a camera.

Moreover, an image pickup apparatus capable of picking up a moving image and a still image and selecting the number of recording pixels in still image pickup and a high-vision (HD) image pickup apparatus also in moving images are spread.

In the case of an exchangeable lens system, a camera and lens advance in improvement of the resolution of an image pickup apparatus and image quality with the times and evolve to various conformations.

For example, though an early exchangeable lens system corresponds to image recording of only a standard TV signal, a camera and lens capable of picking up a resolution still image higher than a TV signal and high vision are developed and put on sale and new and old camera lenses are present.

It is preferable that combination of them is performed without problem in image pickup in combination of marketability, merchandise property and compatibility.

For example, when a camera corresponds to HD and image pickup cannot be performed by even combination with an old lens designed for standard TV, the marketability and merchandise property as an exchangeable lens system are extremely deteriorated.

However, in the case of this combination, because a camera is high-resolution vision, a spatial frequency to be resolved as shown in FIG. 5 is high.

Therefore, a high extraction frequency characteristic of high frequency component to be detected from an image signal is also necessary compared to a conventional TV system.

In some cases, there may be a case in which proper AF cannot be performed unless there is further information. However, in the case of this example, the lens only has a resolution for standard TV and an AF system may be present in the lens.

However, the AF system only has a system for conventional standard TV.

In the case of focus detection means, it is necessary to extract the high-frequency component in the image signal as described above. However, the frequency to be extracted is usually previously decided by a camera.

For example, when a focus signal of a camera is set for high vision in accordance with the above combination, a case in which characteristic is not satisfied and the operation of AF may not be proper.

Moreover, when an AF system is present in a lens, it is possible to perform only AF for conventional TV.

Therefore, it is considered that the AF does not properly operate or does not operate at all.

That is, because a signal to be extracted has a high frequency, a signal change is small when the peak is greatly deviated compared with a case where a frequency to be extracted is low (when focus position is horizontally deviated from the peak position of a high-frequency output signal) as shown in FIG. 6 and response is delayed.

Moreover, a case may occur in which the peak of the fluctuation of the aberration of a lens is detected because the focusing operation is performed by a signal equal to or higher than the resolution of a lens and AF is stopped at a position of not focusing an object.

However, a case may occur in which a lens for high vision is used, a camera for standard TV is used, AF is a lens for high vision and signal for focusing is generated by the camera and transmitted to the lens.

In this case, because the lens receives only a signal for standard TV, when performing AF for high vision, a case may occur in which AF starts from a greatly deviated state or operation nearby focusing is not properly performed.

Moreover, a case is assumed in which a camera capable of picking up a still image and NTSC-type moving image is used, a lens has an AF function regulated to NTSC, the focusing signal of the camera is regulated to an NTSC-type frequency to be extracted and a still image is recorded at higher pixel and higher density than in the case of NTSC type.

FIG. 7 is an illustration showing comparison between spatial frequency characteristic to be resolved of NTSC and spatial frequency to be resolved when recording images at high pixel and high density when picking up a still image.

As shown in FIG. 7, it is assumed that the spatial frequency to be resolved in the case of NTSC is as NTSCHz and a still image is picked up at 3 million pixels more than a necessary spatial frequency of NTSC.

In this case, the spatial frequency to be resolved "Still-300" Hz becomes higher than the spatial frequency to be resolved for NTSC.

In this case, it is assumed that the spatial frequency to be resolved is not a frequency at a limit in which the frequency can be resolved but a frequency having high enough MTF is an object spatial frequency to be resolved as indicated by the arrows in FIG. 7.

Though this deciding method is optional, sufficient MTF is obtained when setting approx. 80% of a limit resolution spatial frequency as a target.

Therefore, when picking up a still image of 3 million pixels by using the spatial frequency of "NTSC" Hz to be resolved of NTSC as a frequency characteristic for focusing detecting of AF, defocusing can be recognized due to the difference of resolution limit of the spatial frequency.

That is, it is impossible to detect the peak of a focus for the object of "Still-300" Hz.

Also in this case, a problem same as a case of combination of standard TV and HD previously described occurs.

That is, it is difficult to detect a focus position from a defocusing state and as a result, response characteristic is deteriorated. Similarly, because positional width of peak is narrow nearby the peak, a problem in lacking in stability occurs by overshooting a peak position.

However, by taking only still image pickup as an example, in the case of a camera having a plurality of settings of a picked-up image such as compression rate and number of pixels for recording, a necessary spatial frequency characteristic depends on the setting.

For example, when it is possible to select one million pixels and two million pixels as the number of image-picking up pixels, the necessary AF frequency characteristic for them differs as shown in FIG. 8.

Therefore, a problem of AF operation same as the case in which a camera corresponds to high vision and standard TV occurs as previously described.

Moreover, the performance of a lens depends on the focal length, focus position and aperture stop and they are also factors of change in resolving powers of the lens.

Therefore, frequency characteristics necessary for AF are also changed due to a lens state. For example, a spatial frequency to be resolved differs between WIDE (wide side) and TELE (telephoto side) for the focal length as shown in FIG. 9.

In general, a spatial frequency to be resolved in WIDE is higher than in TELE because an object image becomes more minute in WIDE than in TELE.

Nowadays, while change in zoom to high magnification advances, the difference between spatial frequencies to be resolved at WIDE end and TELE end tends to increase.

Moreover, as shown in FIG. 10, a spatial frequency to be resolved depends on F No. of an aperture stop. Therefore, a phenomenon same as the case previously described occurs in AF.

Furthermore, the resolving power of a lens may be changed depending on a focus position. FIG. 11 is an example in which spatial frequencies to be resolved at focus positions differ.

Therefore, a problem same as the case previously described occurs in AF.

Various problems of AF occur in a lens and an image pickup apparatus because a frequency to be resolved differs in accordance with the type or state of a lens to be set like this and the type or image pickup state of a camera, respectively.

SUMMARY OF THE INVENTION

Therefore, it is an object of the present invention to provide an image pickup apparatus capable of realizing a preferable automatic focus regulation performance in any exchangeable lens, its lens state, combination with a camera or image pickup state.

To achieve the above object, in the case of an image pickup apparatus of the present invention whose lens is exchangeable is constituted so as to change an output of focus detection means from the information sent from the exchangeable lens to a camera or information sent from the camera to the lens or change a frequency detected by the focus detection means.

The above and other objects, features, and advantages of the invention will become more apparent from the following detailed description taken in conjunction with the accompany drawings.

BRIEF DESCRIPTION OF THE DRAWINGS

FIGS. 4A, 4B, 4C, 4D, 4E and 4F are data characteristic diagrams of a line memory 40, DCT circuit 42, weighting circuit 46 and predetermined-frequency-component extraction circuit 46;

DETAILED DESCRIPTION OF THE PREFERRED EMBODIMENTS

The present invention is described below in accordance with embodiments by referring to the accompanying drawings.

Embodiment 1

Embodiments of the present invention are described below in detail by referring to the accompanying drawings.

Figure 1:
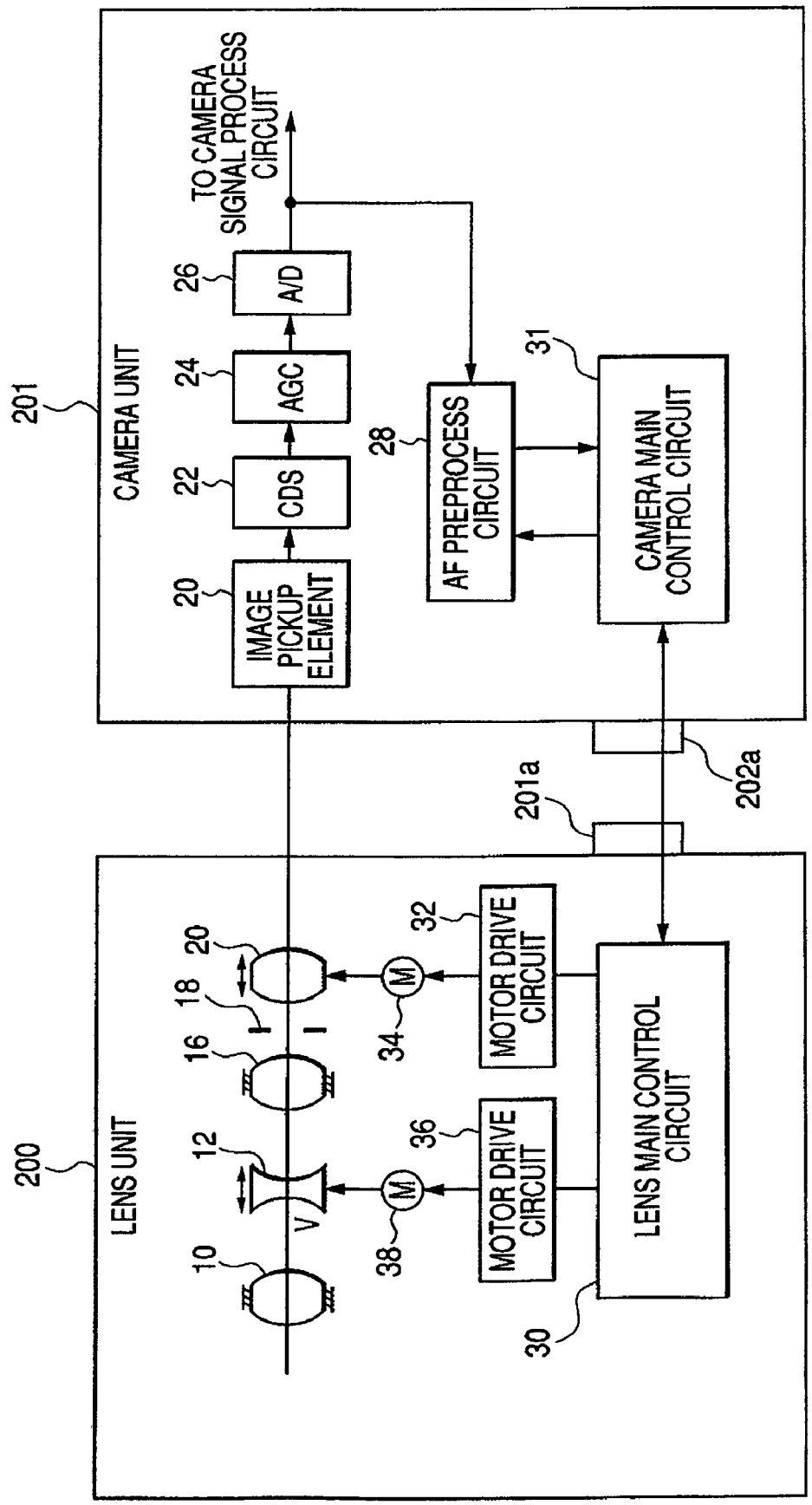
FIG. 1 is a schematic block diagram of embodiment 1 of the present invention.

FIG. 1 shows a schematic block diagram of an embodiment of the present invention.

A lens unit 200 which is an exchangeable lens is set to a camera unit 201 through a lens mount 201a and camera mount 202a.

The light from an object enters the image pickup surface (photoelectric conversion surface) of an image pickup device 20 by passing through a fixed first lens group 10, variable power lens 12, aperture stop 14, fixed third lens group 16 and focusing lens 18.

The image pickup device 20 converts an optical image on an image pickup face into electrical signals.

An output signal of the image pickup device 20 is sample-held by a CDS circuit 22, amplified to a predetermined level by an AGC circuit 24 and then converted into a digital signal by an A/D converter 26.

An output signal of the A/D converter 26 is supplied to a not-illustrated camera signal process circuit.

An output of the A/D converter 26 is input to an AF preprocess circuit 28.

The AF preprocess circuit 28 generates an AF evaluation value and supplies the AF evaluation value to a camera main control circuit 31 constituted of a microcomputer.

The camera main control circuit 31 captures an output (AF evaluation value) of the AF preprocess circuit 28 and transmits the output to a lens main control circuit 30 through the camera mount 202a and lens mount 201a.

The lens main control circuit 30 decides a focusing speed and motor driving direction in which an AF evaluation value increases in accordance with a focusing degree and controls a motor driving circuit 32 in accordance with the decided speed and direction.

The motor driving circuit 32 drives a focus motor 34 in accordance with an instruction from the camera main control circuit 31 and thereby moves the focusing lens 18 to a focusing position at the decided speed.

Thereby, the focusing lens 18 is controlled to a position at which an AF evaluation value is maximized.

The lens main control circuit 31 rotates a zoom motor 38 by a motor driving circuit 36 in accordance with the variable power operation by a user to move the variable power lens 12 up to a designated position.

Thereby, it is possible to change focal lengths and image pickup magnifications are changed.

Figure 2:
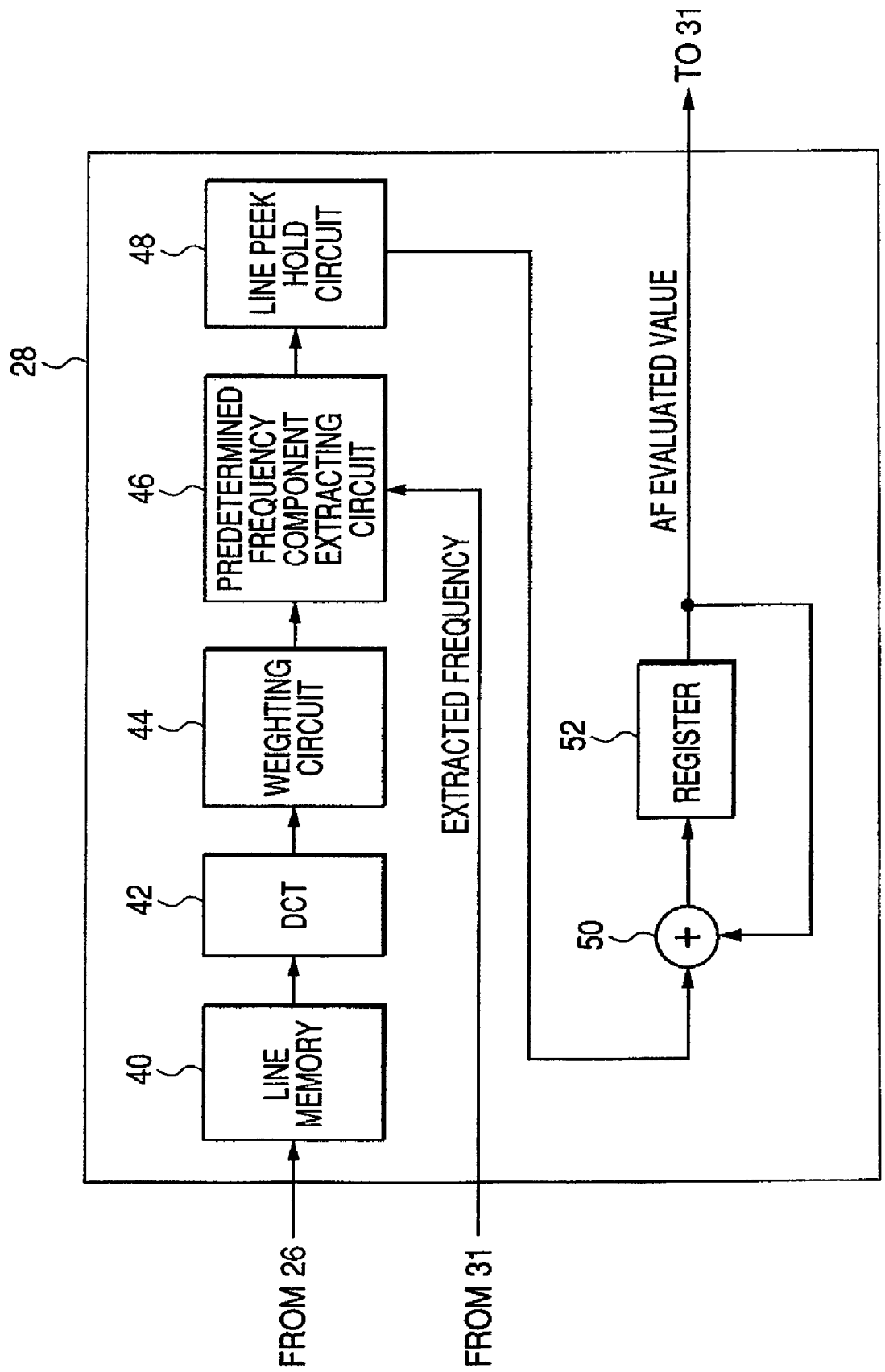
FIG. 2 is a schematic block diagram of an example of an AF preprocess circuit.

FIG. 2 shows a schematic block diagram of an example of the AF preprocess circuit 28.

Figure 3:
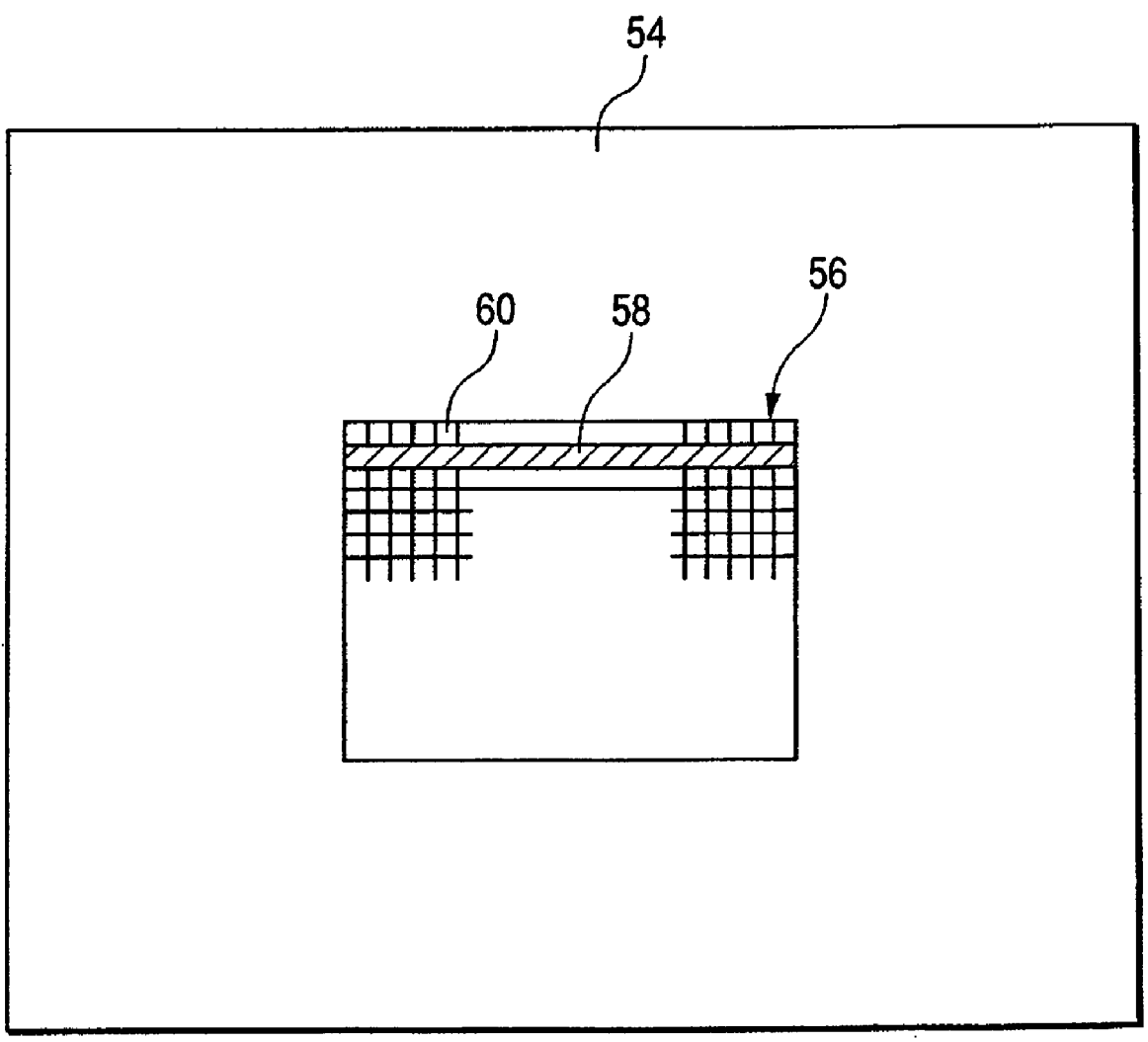
FIG. 3 is an illustration of a focus detection area in a screen and an image configuration in the focus detection area.
Figure 5:
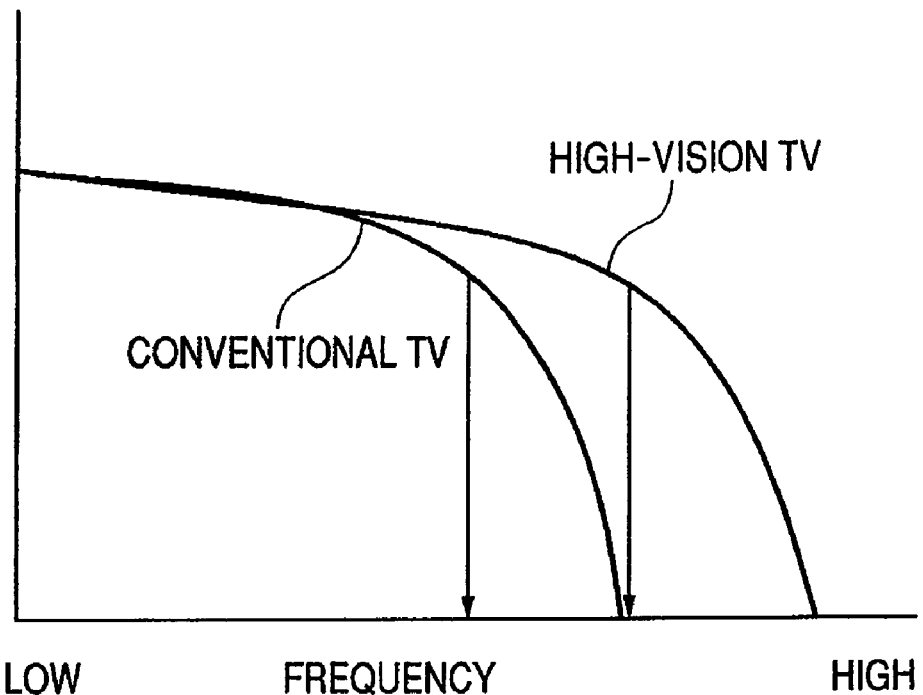
FIG. 5 is an extraction frequency characteristic diagram of a high frequency component detected from an image signal.
Figure 6:
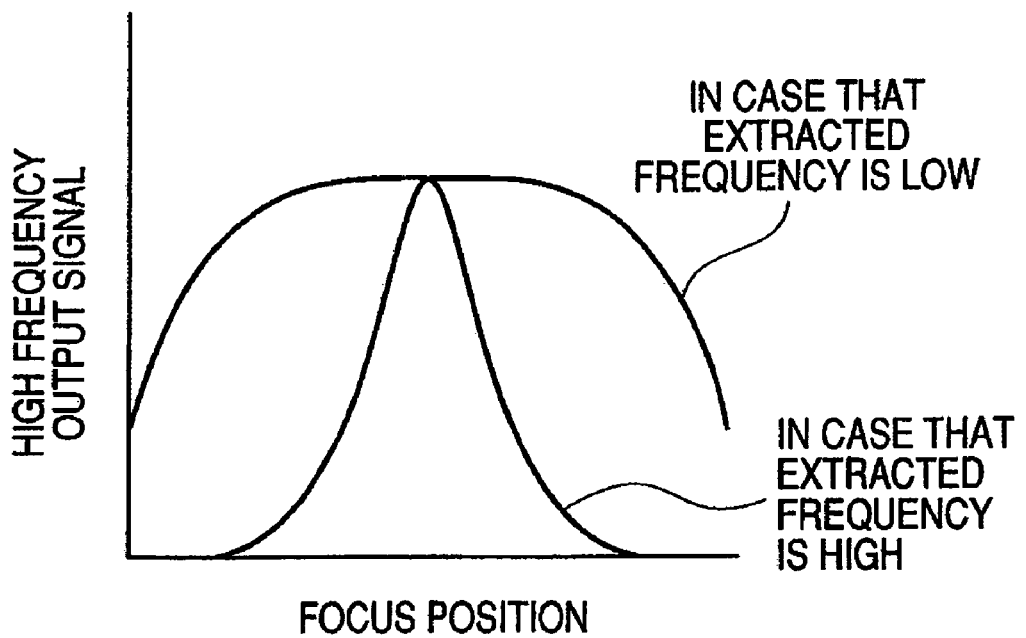
FIG. 6 is a relational diagram between output of signal of high frequency component of AF and position of focus when an extraction frequency is high.
Figure 7:
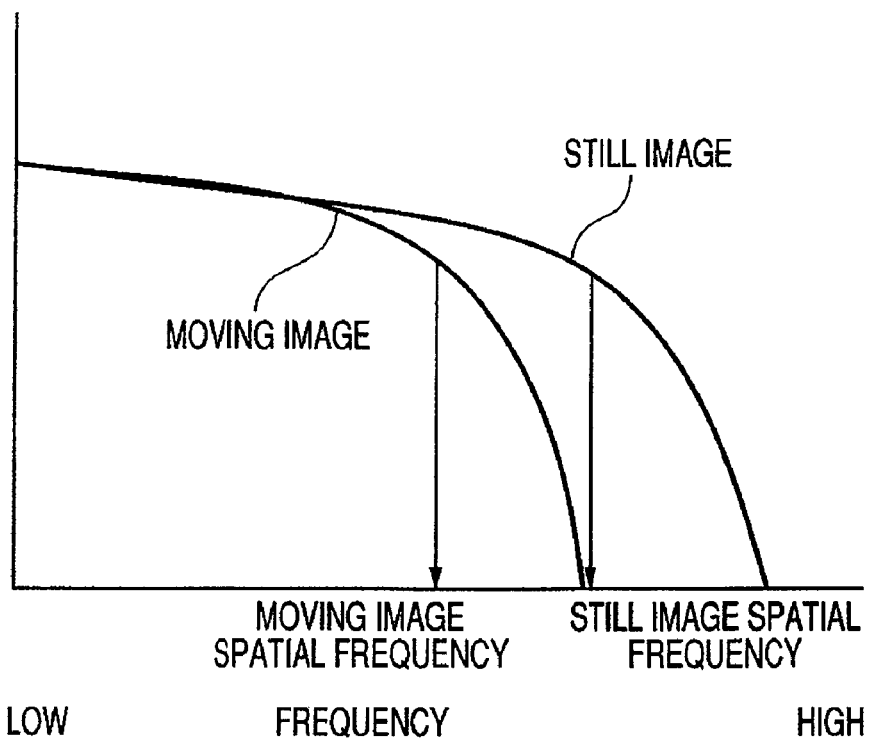
FIG. 7 is a comparison diagram between spatial frequency characteristic to be resolved of NTSC and spatial frequency to be resolved when recording a still image at a high pixel and high density.
Figure 8:
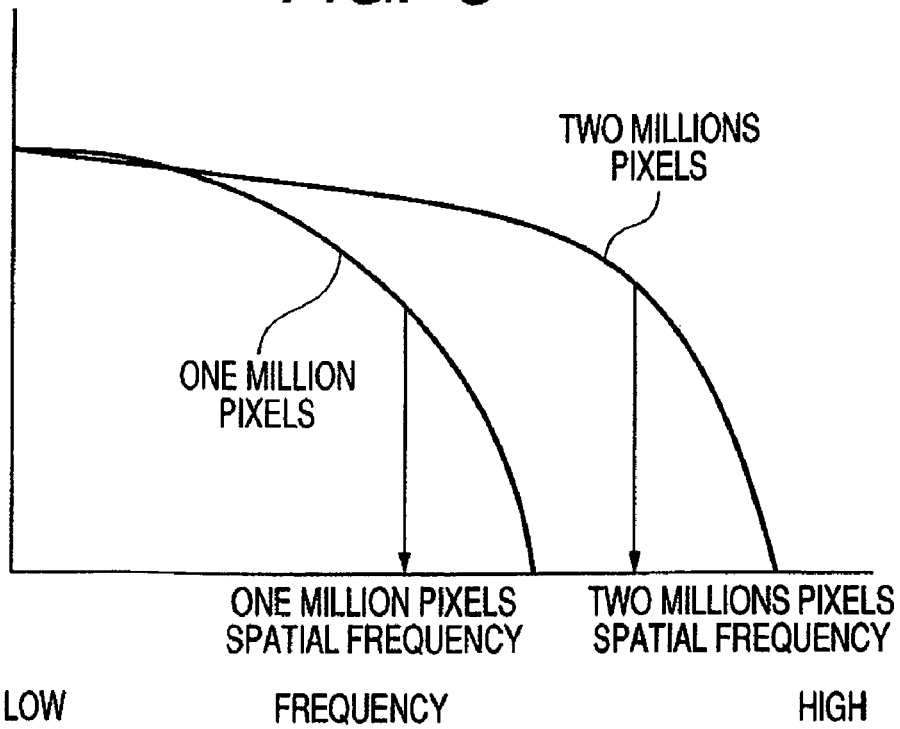
FIG. 8 is a frequency characteristic diagram of a spatial frequency to be resolved of AF.
Figure 9:
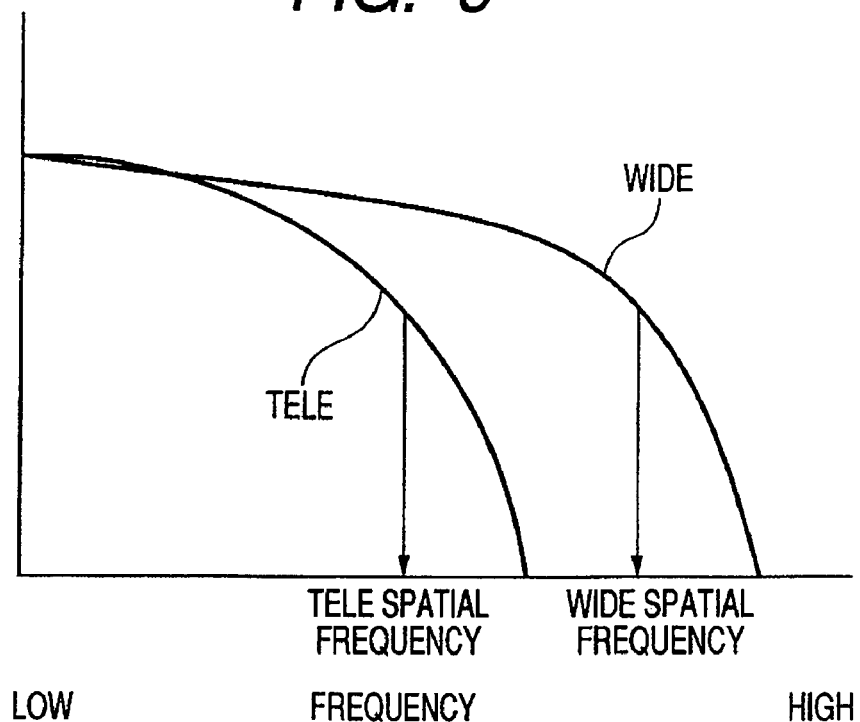
FIG. 9 is a spatial frequency characteristic diagram to be resolved of wide and tele.
Figure 10:
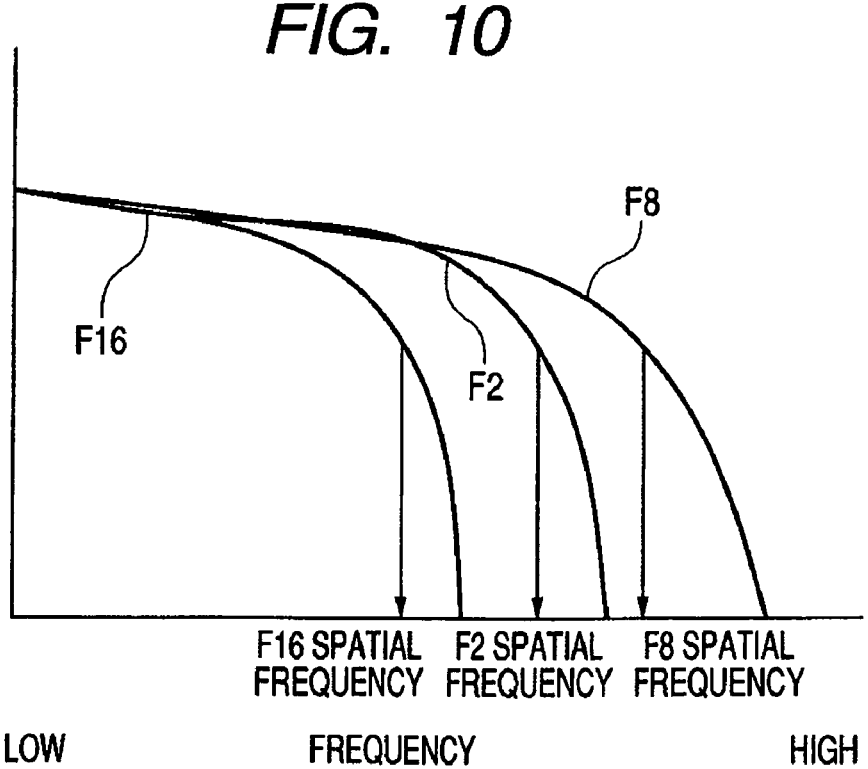
FIG. 10 is a spatial frequency characteristic diagram to be resolved in accordance with FNo. of an aperture stop.
Figure 11:
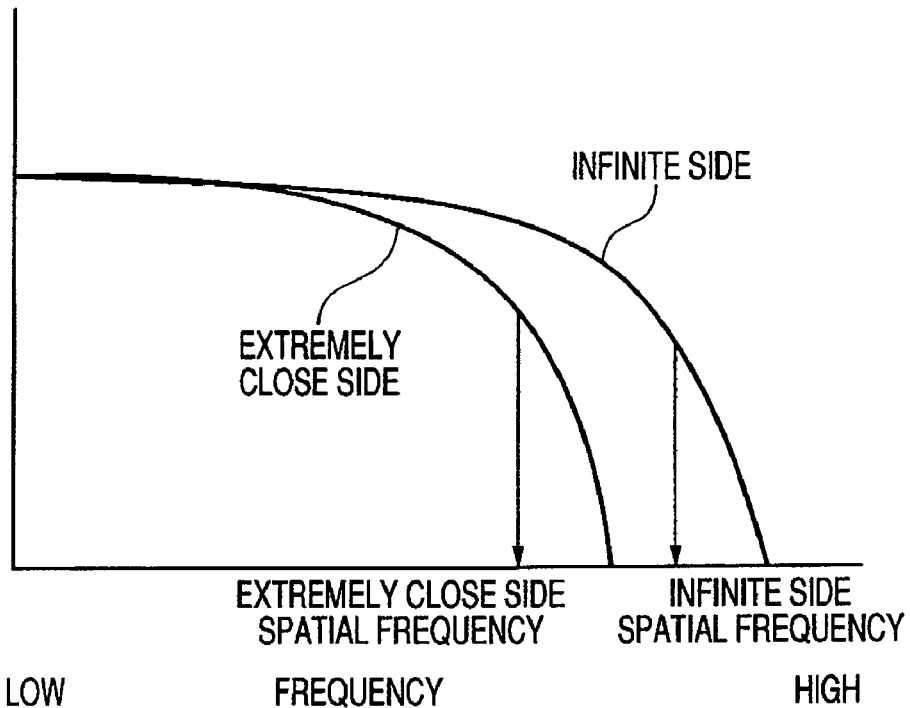
FIG. 11 is a spatial frequency characteristic diagram to be resolved at the position of a focus.

FIG. 3 is an illustration of a focus detection area in a screen and a pixel configuration in the focus detection area.

A focus detection area 56 is set in a screen 54 of one frame or one field. The focus detection area 56 is constituted of a plurality of horizontal lines 58 and each horizontal line 58 is constituted of a plurality of pixels 60.

As shown in FIG. 2, the line memory 40 stores pixel data for one horizontal line P0, P1, . . . and Pn of the focus detection area 56 from the output data of the A/D converter 26.

A discrete cosine conversion (DCT) circuit 42 orthogonally converts the image data for one horizontal line in the line memory 40 and outputs frequency area data F0, F1, . . . and Fn.

A weighting circuit 44 multiples an output of the DCT circuit 42 by predetermined constants K0 to Kn so that frequency components have almost uniform level.

That is, the weighting circuit 44 outputs k0×P0, K1×P1, . . . and Kn×Pn.

The predetermined frequency component extraction circuit 46 extracts only components instructed by the camera main control circuit 31 from outputs k0×P0, K1×P1, . . . and Kn×Pn of the weighting circuit 44 and outputs the components.

A line peak hold circuit 48 holds the maximum value in outputs for one line output from the predetermined frequency component extraction circuit 46 and updates a held value by the maximum value of the next horizontal line every horizontal line.

An adder 50 and a register 52 constitute an accumulator.

The accumulator functions as a vertical-directional integration circuit and accumulates and adds outputs of the line peak hold circuit 48.

That is, at first, the register 52 is set to zero. Then, the adder 50 adds an output of the register 52 to an output of the line peak hold circuit 48 and writes an addition result in the register 52.

By executing the above operation for all horizontal lines 58 in the focus detection area 56, an accumulated value of maximum values of predetermined frequency components of all horizontal lines 58 in the focus detection area is stored in the register 52.

The stored value of the register 52 is supplied to the camera main control circuit 31 as an AF evaluation value.

FIGS. 4A to 4F show examples of data transition in the line memory 40, DCT circuit 42, weighting circuit 46 and predetermined frequency component extraction circuit 46.

FIG. 4A shows a data string stored in the line memory 40, FIG. 4B shows a data string output from the DCT circuit 42 and FIG. 4C shows an output data string of the weighting circuit 42.

FIGS. 4D, 4E and 4F are output examples of the predetermined frequency component extraction circuit 46.

In the case of outputs F0 to Fn of the DCT circuit 42, F0 is a lowest frequency component nearby a DC component, frequency becomes higher in order of F1, F2, . . . and Fn is a highest frequency component.

The camera main control circuit 30 obtains the identification signal of a lens from communication with the lens main control circuit 31. It is possible to determine the characteristic of the lens in accordance with the identification signal. For example, it is possible to determine a content format of a signal necessary for the lens-side performance (SD or HD) AF.

In the case of the present invention, a camera can change the contents by the identification signal when transmitting a signal for AF to the lens.

In the case of this embodiment, it is described that a frequency characteristic extracted from an image signal is changed and transmitted to a lens.

For example, when there are a plurality of exchangeable lenses having AF systems different from each other and an AF signal suitable for each lens is previously known, it is possible to output a signal converted into a format suitable for each lens in accordance with lens identification information. Moreover, it is allowed to directly send a signal for driving the focus motor 34 from the camera main control circuit 31. Thereby, it is possible to perform preferable AF by any combination.

Figure 12:
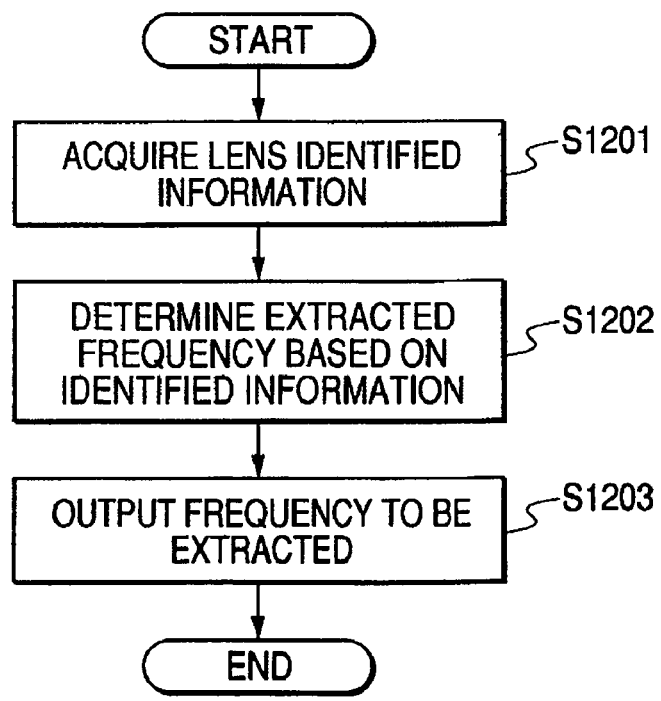
FIG. 12 is an operation flow chart of embodiment 1 of the present invention.

FIG. 12 shows a flow.

In S1201, the camera main control circuit 30 obtains the identification information on a lens.

In S1202, the band of a frequency extracted from an image signal is determined from the lens identification information and decided in S1203.

In this case, the camera main control circuit 31 determines whether to send the information on a frequency extracted to the lens main control circuit to the lens in accordance with a lens identification signal and can transmit the information according to necessity.

This function makes it possible to perform preferable AF even if frequencies extracted from image signals differ when performing AF are different.

Embodiment 2

Then, embodiment 2 of the present invention is described below.

This embodiment has a feature of deciding a spatial frequency to be resolved and deciding the frequency band of a high frequency component extracted from an image signal by adding a lens state and image pickup state.

Figure 13:
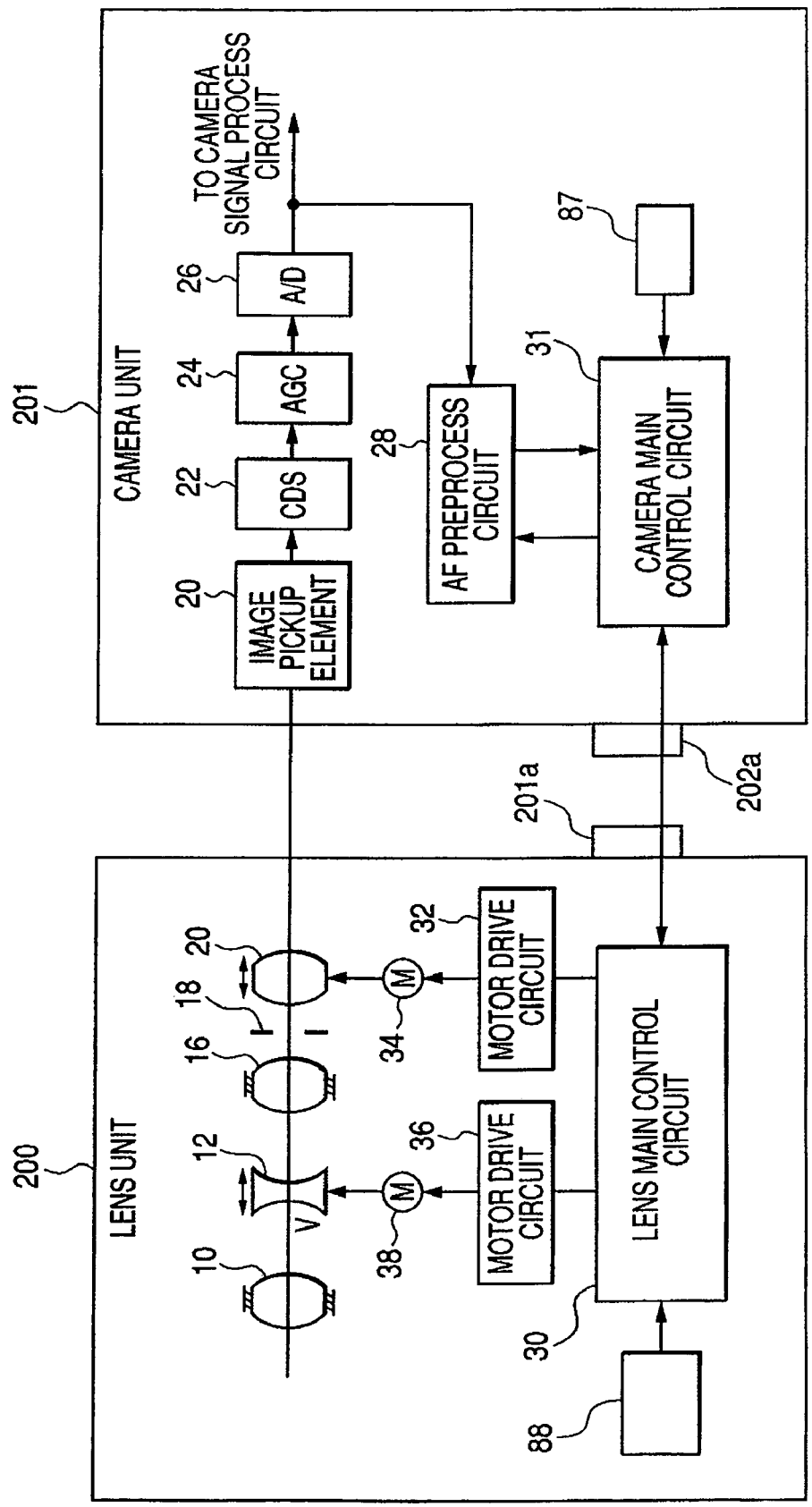
FIG. 13 is a schematic block diagram of embodiment 2 of the present invention.

Description is continued by referring to FIG. 13. A portion same as FIG. 1 is provided with the same symbol and its description is omitted.

Image pickup state detection means 87 detects a still image and moving image and image pickup states such as the size, number of pixels, compression rate, pixel density of an image to be picked up. The detected image pickup states are input to the camera main control circuit 30.

Moreover, states of a lens such as focal length information, aperture stop information and focus information are detected by lens state detection means 88 and input to the lens main control circuit 31.

Even for the same lens and image pickup means, a spatial frequency which can be resolved depends on a lens state, image pickup mode or compression rate.

For example, even if an image pickup state is 2 million pixels of a still image and free from compression and a spatial frequency to be resolved is 10 MHz, when a lens state is a spatial frequency to be resolved of 0.5 MHz when a lens state is telephoto side end infinite F8, 0.5 MHz is sufficient for a frequency extracted by an image signal for AF.

As previously described, because the spatial frequency is high, when raising a frequency to be extracted, a problem occurs that it is difficult to find a focus direction at the time of defocusing because change of signals is small at a portion other than a portion nearby focus peak.

Therefore, it is necessary to decide an optimum extraction frequency for AF by adding a lens characteristic and image pickup state.

The main control circuits 30 and 31 respectively have a spatial frequency detection function and extraction frequency determination function.

Figure 14:
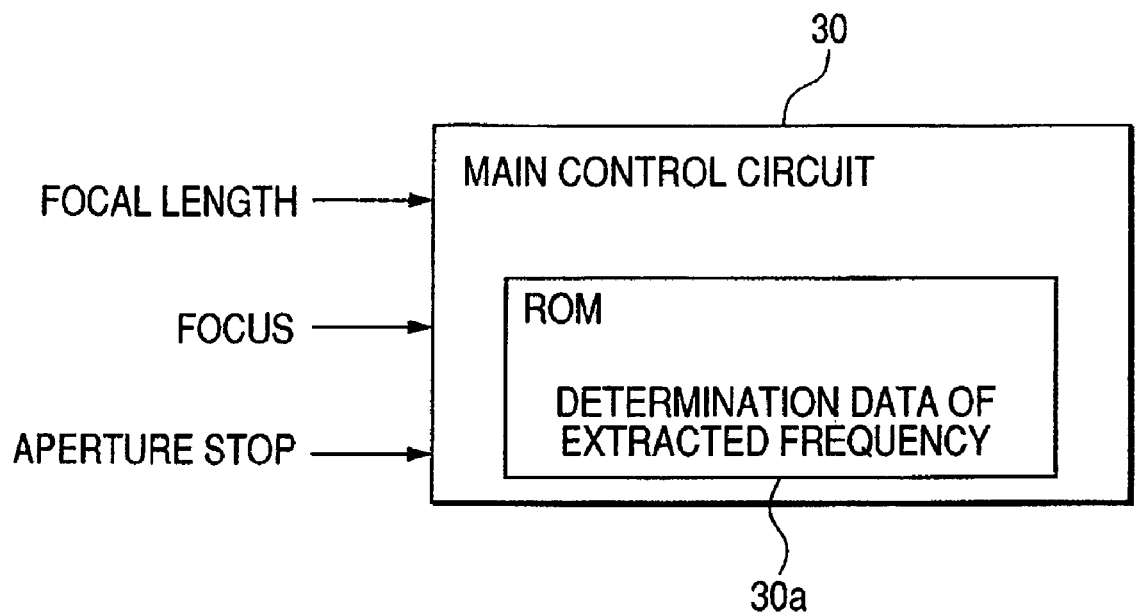
FIG. 14 is an illustration of a main control circuit constituting the embodiment 2 of the present invention.
Figure 15:
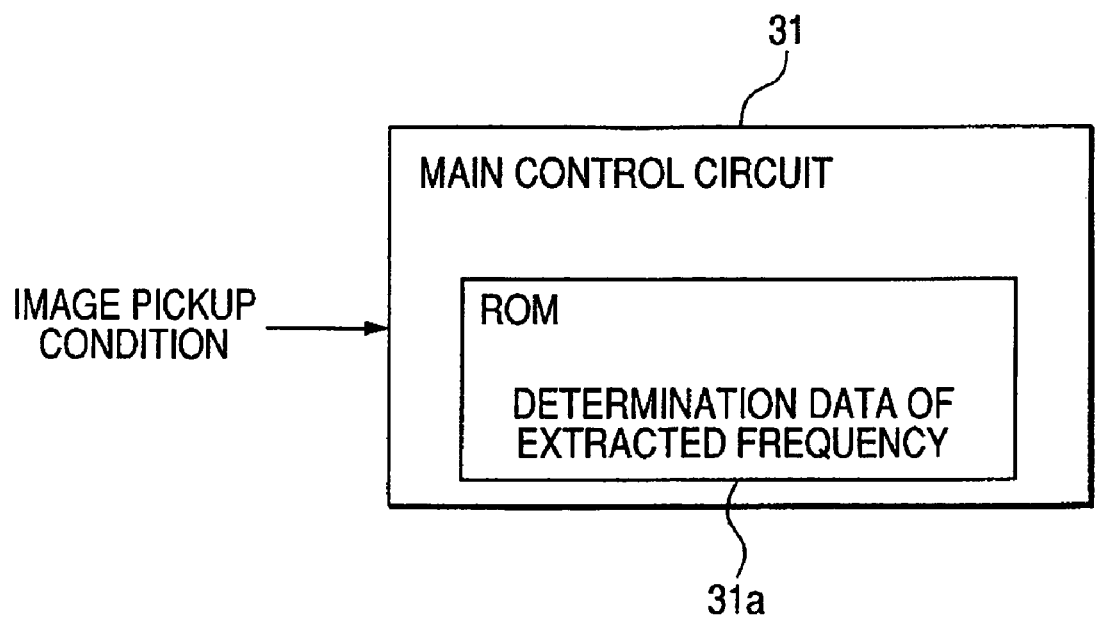
FIG. 15 is an illustration of a main control circuit constituting the embodiment 2 of the present invention.

Extraction frequency determination data is stored in ROMs 30a and 31a in the main control circuits 30 and 31 shown in FIGS. 14 and 15.

It is decided in which frequency band frequency component data is extracted by the predetermined frequency component extraction circuit 46 in accordance with the extraction frequency determination data stored in built-in ROMs 30a and 31a from an image pickup state and lens state.

Figure 16:
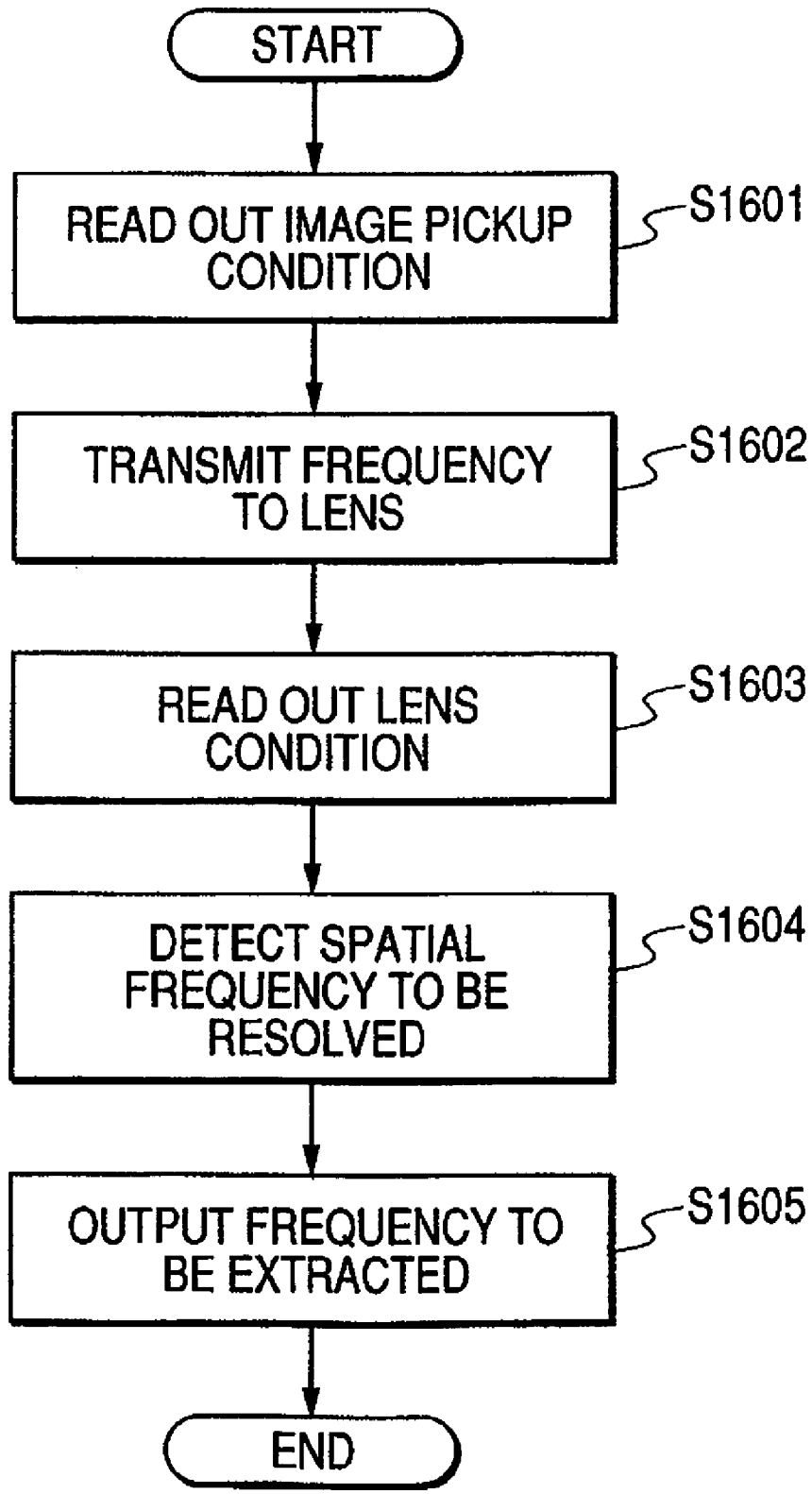
FIG. 16 is an operational flowchart of the embodiment 2 of the present invention.

For example, a case in which a camera decides an extraction frequency in accordance with a designation from a lens is described below by referring to the flow in FIG. 16.

In S1601, the camera reads image pickup states (image pickup mode and image compression rate, etc) and in S1602, transmits a spatial frequency to be resolved or frequency to be extracted from an image signal to the lens.

In S1603, the lens reads the lens state and compares a spatial frequency to be resolved obtained in S1604 with a frequency extracted from an image signal obtained from the spatial frequency.

A lower frequency of them is designated to the camera as a frequency to be extracted in S1605 and the camera obtains a signal in accordance with the designation in S1604.

Figure 17:
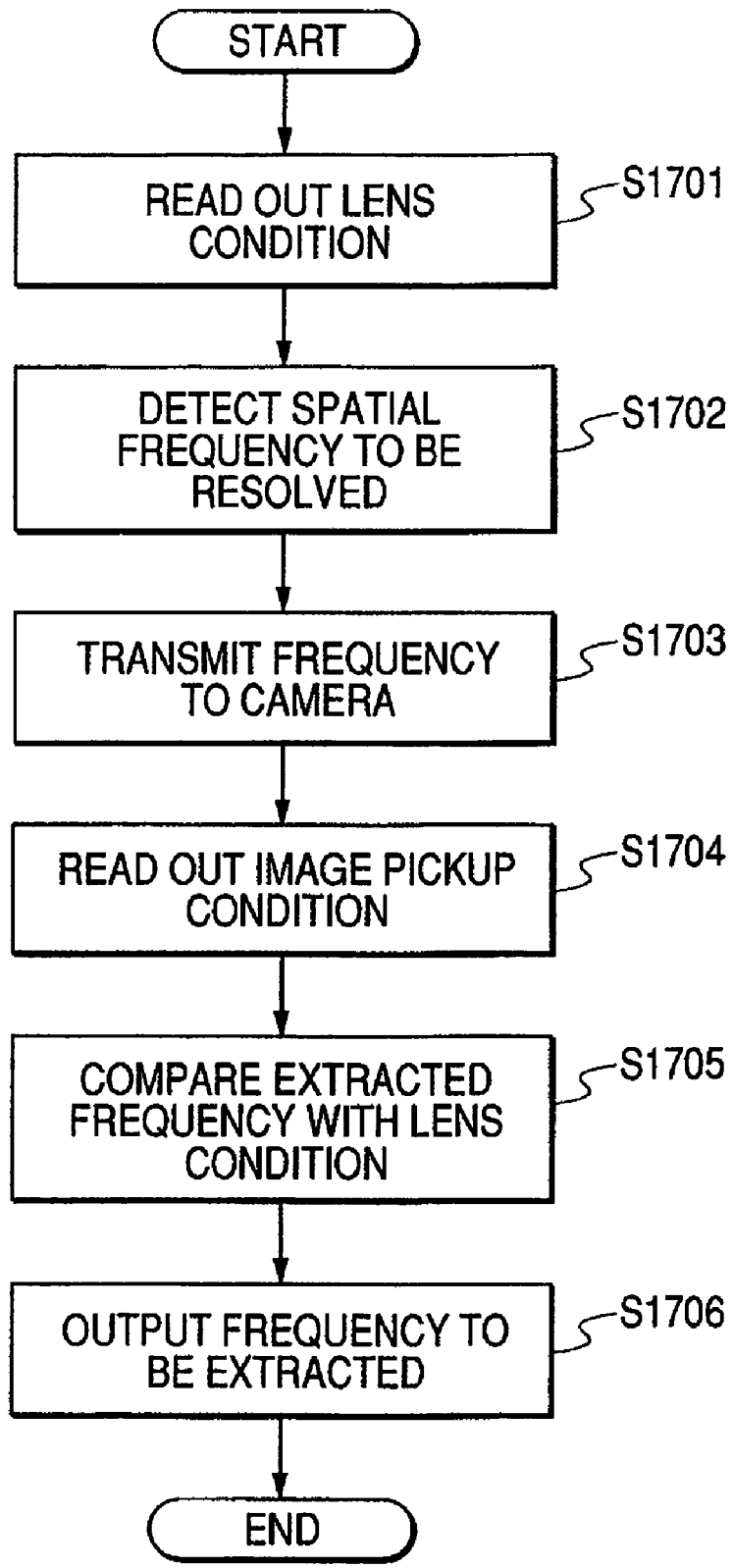
FIG. 17 is an operational flowchart of the embodiment 2 of the present invention.

Moreover, a case in which the camera obtains lens information from the lens is described in accordance with the flow in FIG. 17.

The lens main control circuit 31 reads the lens state in S1701 and obtains frequency information extracted from a spatial frequency to be resolved in the lens state or frequency information extracted from the image signal in S1702.

The frequency is transmitted to the camera main control circuit 30 in S1703 and the camera main control circuit 30 reads an image pickup state in S1704.

A spatial frequency to be resolved or frequency extracted from the image signal is detected from the pickup state in S1705 and compared with the information from the lens state obtained in S1703.

It is also allowed to obtain a lower frequency of them as a frequency to be extracted in S1706.

Moreover, because automatic focusing means is present in the camera, it is allowed to communicate AF driving information such as speed, direction and driving value to the lens to perform AF.

Figure 18:
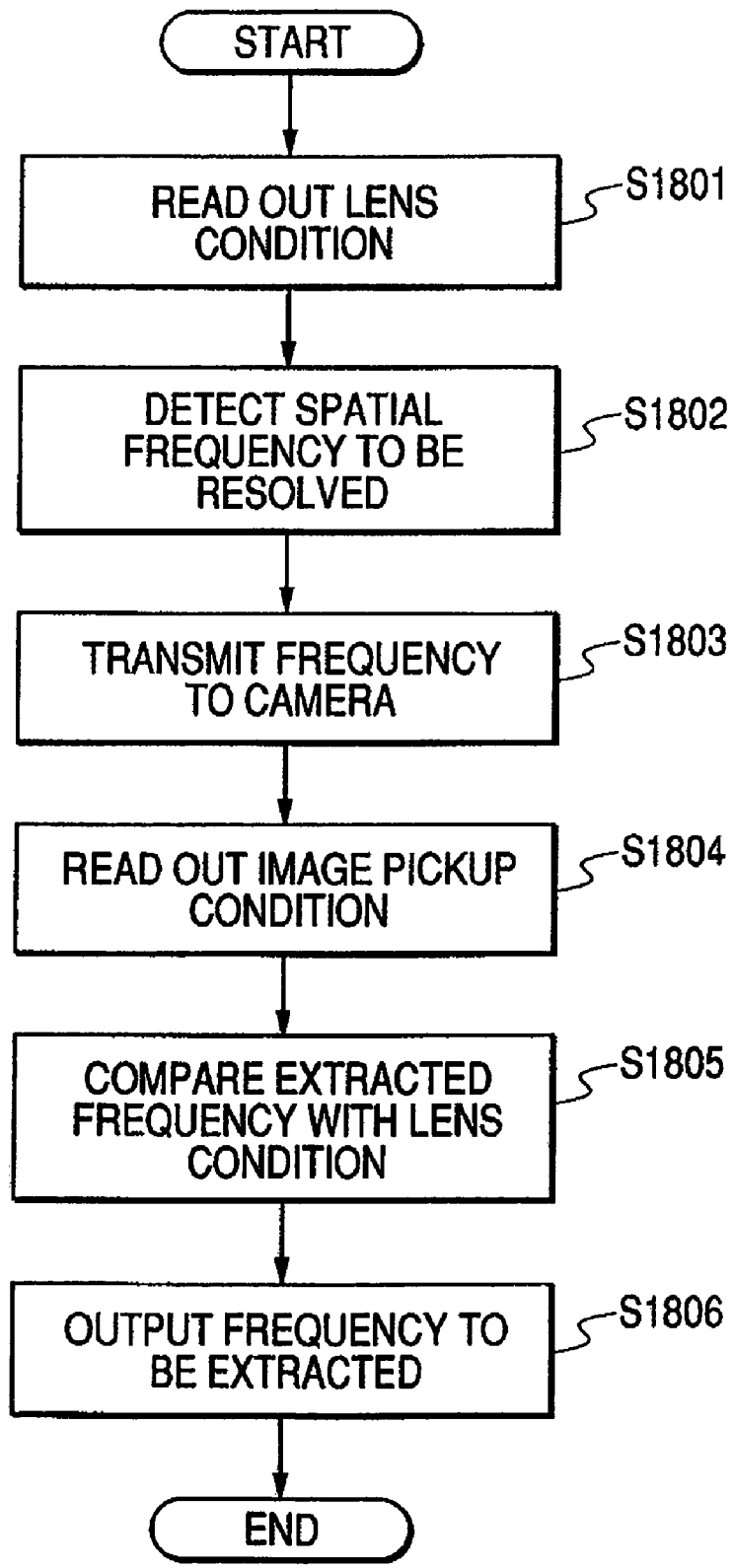
FIG. 18 is an operational flowchart of the embodiment 2 of the present invention.
Figure 19:
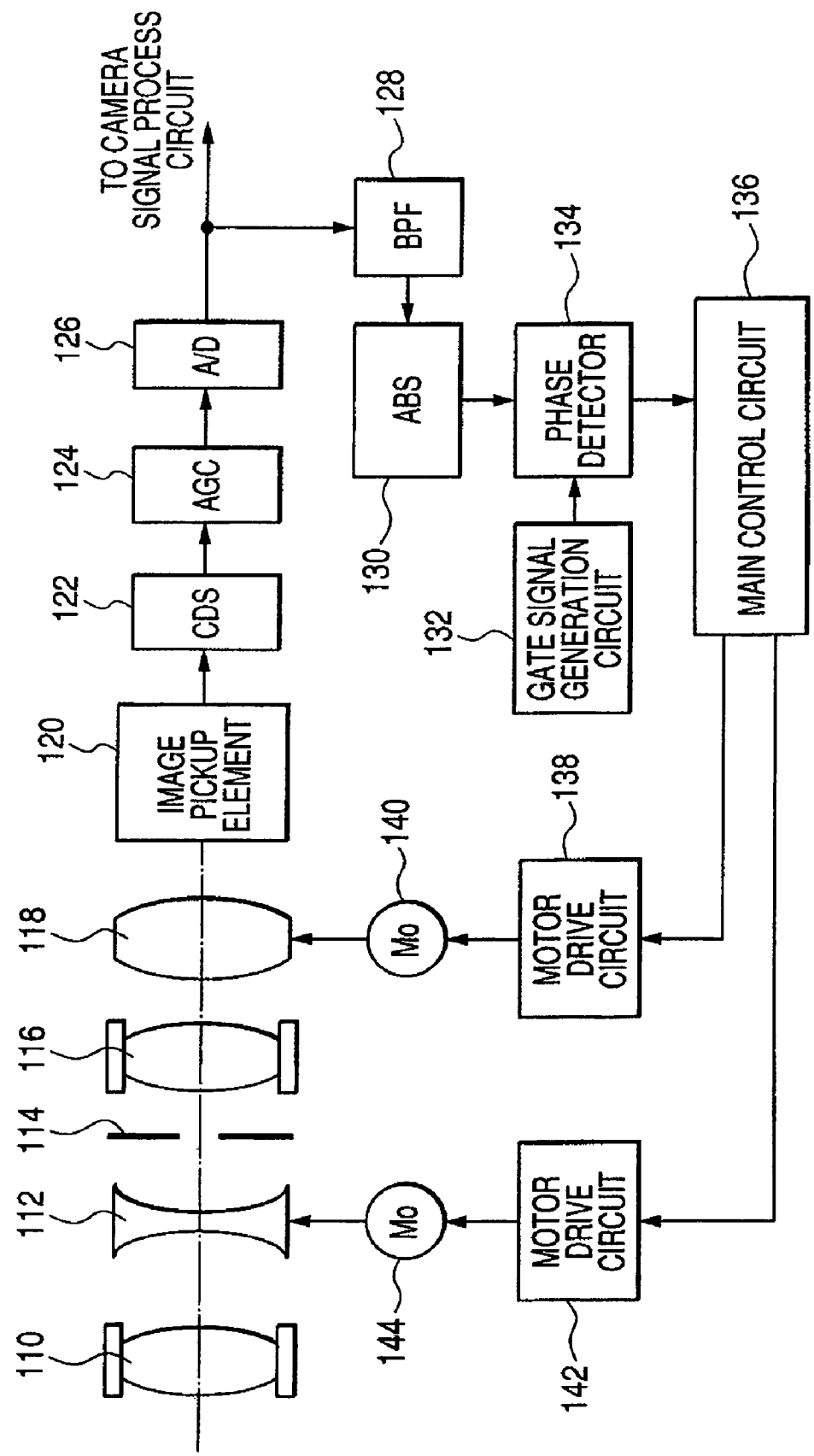
FIG. 19 is a block diagram of a conventional maximum-power-point-tracking-type automatic focus regulator.
Figure 20:
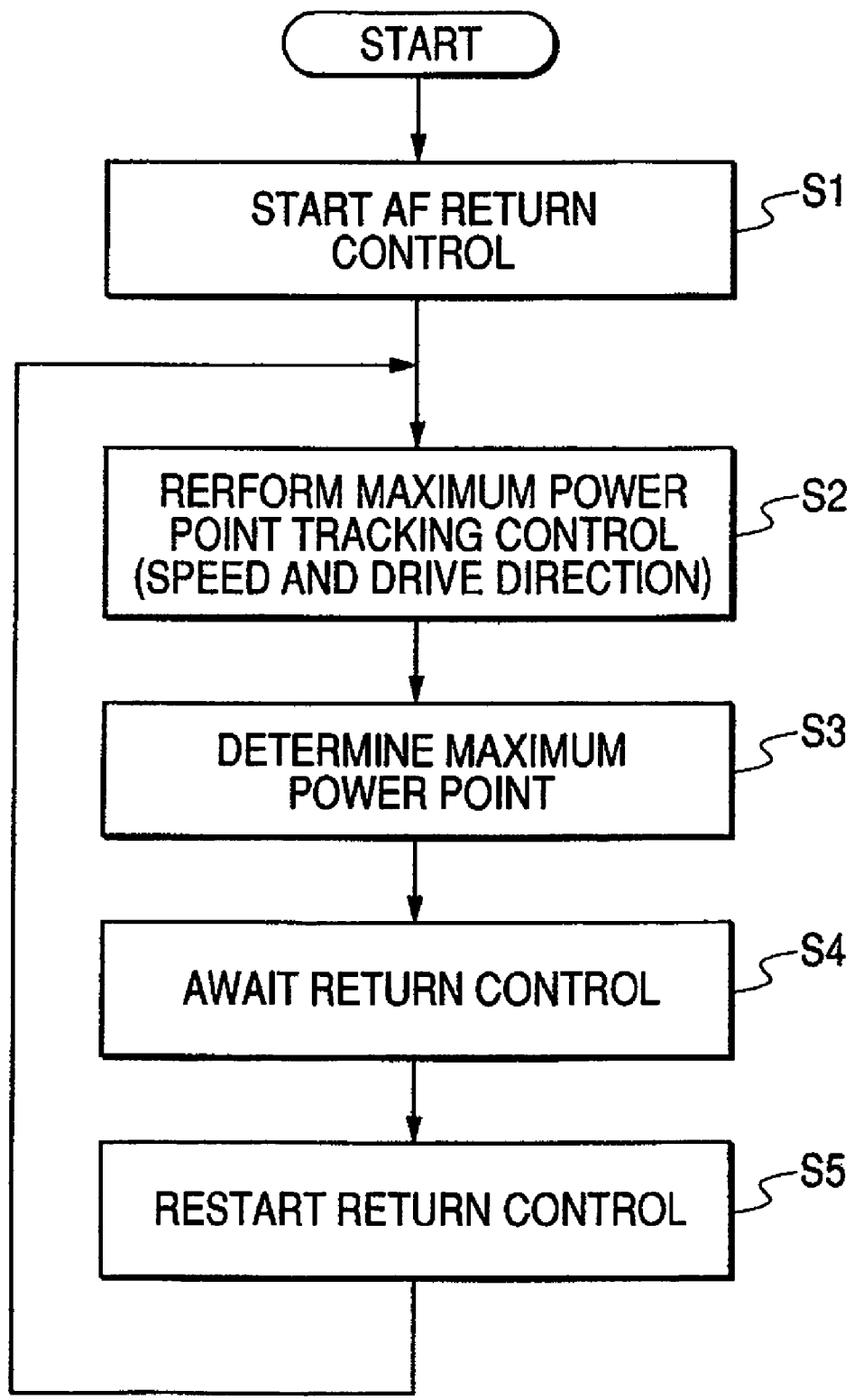
FIG. 20 is a flowchart of automatic focus regulation operation by a conventional maximum-power-point-tracking-type main control circuit.

Description is made below by referring to the flow in FIG. 18. In S1801, the lens main control circuit 31 reads a lens state.

In S1802, a spatial frequency to be resolved in the lens state or frequency information extracted from an image signal is obtained.

The spatial frequency or frequency information is transmitted to the camera main control circuit 30 in S1803 and the camera main control circuit 30 reads an image pickup state in S1804.

A spatial frequency to be resolved or frequency extracted from an image signal is detected from the pickup state in S1805 and compared with the information from the lens state obtained in S1803.

A lower frequency of them is a frequency to be extracted in S1806 to perform AF in accordance with the decided extraction frequency.

It is allowed to set a frequency band to be selected to the spatial frequency of the lens but when the band exceeds the upper limit or lower limit, the band is set to the upper limit value or lower limit value.

For example, when lens information is WIDE end, F8 and infinite end and an image pickup state is a moving image and NTSC, a spatial frequency to be resolved is 5 MHz from the lens information and a spatial frequency to be resolved is 3 MHz from the image pickup state, a frequency to be resolved is decided as 3 MHz because 3 MHz is lower than 5 MHz.

Therefore, in this case, a frequency band to be extracted to the predetermined frequency component extraction circuit 46 is designated as 3 MHz.

The spatial frequency to be resolved in the above case is not a limit frequency to be resolved but it is a sufficient frequency of MTF and approx. 80% of a resolution limit frequency.

By this, because a frequency to be extracted is selected according to a spatial frequency which can be actually resolved according to the lens information and the pickup information, defocusing does not occur.

As described above, according to the present invention, it is possible to solve the problems that the response of AF from a defocused state and operations are not stabilized.

As many apparently widely different embodiments of the present invention can be made without departing from the sprit and scope thereof, it is to be understood that the invention is not limited to the specific embodiment thereof except as defined in the appended claims.

This application claims priority from Japanese Patent Application No. 2004-366035 filed Dec. 17, 2004, which is hereby incorporated by reference herein.

What is claimed is:

1. A camera unit on which an interchangeable image-pickup lens unit having a focus lens unit is attached, the camera unit comprising:
an image pickup unit for picking up the image of an object;
a signal processing unit for extracting a signal in a specific frequency bands, from an image obtained by the image pickup unit; and
control means for computing a signal indicating a focusing degree in accordance with a signal input from the signal processing unit,
wherein the control means determines the specific frequency bands from among predetermined frequency bands for focusing to be extracted in accordance with an identification signal for identifying interchangeable image-pickup lens unit characteristics.

2. The camera unit according to claim 1, wherein the identification signal for identifying interchangeable image-pickup lens unit characteristics is a signal designating that the interchangeable image-pickup lens unit is associated with a high vision type image or a NTSC type image.

3. An image pickup apparatus comprising:
the camera unit according to claim 1; and
the interchangeable image pickup lens.

4. A camera unit comprising:
an image pickup unit for picking up the image of an object:
a signal processing unit for extracting a signal in a specific frequency bands, from an image obtained by the image pickup unit;
image pickup state detection means; and
control means for computing a signal indicating a focusing degree in accordance with a signal input from the signal processing unit, and determining the specific frequency bands from among the predetermined frequency bands for focusing, to be extracted in accordance with a detection result of the image pickup state detection means,
wherein the image pickup state detection means detects at least one of items whether the picked-up image is a moving image or a still image, whether the picked-up image is a standard type image or a high vision type image, and a number of pixels, an image size, a compression rate, and a pixel density, used for picking up the image.

5. An image pickup apparatus comprising:
the camera unit according to claim 4; and
the lens unit having a focus lens unit.

6. A camera unit comprising:

an image pickup unit for picking up the image of an object;

a signal processing unit for extracting a signal in a specific frequency bands, from an image obtained by the image pickup unit; and control means for computing a signal indicating a focusing degree in accordance with a signal input from the signal processing unit, and for determining the specific frequency bands from among the predetermined frequency bands for focusing in accordance with the transmitted detection result of a lens state detection means for detecting a status of a lens unit, wherein the lens state detection means detects at least one of a focal length information, an aperture stop information, and a focus information.

7. An image pickup apparatus comprising:

the camera unit according to claim 6; and a lens unit having the lens state detection means.

8. A camera unit comprising:

an image pickup unit for picking up the image of an object;

image pickup state detection means;

a signal processing unit for extracting a signal in a specific frequency bands, from an image obtained by the image pickup unit; and control means for computing a signal indicating a focusing degree in accordance with a signal input from the signal processing unit, wherein the control means compares the first specific frequency bands from among the predetermined frequency bands for focusing, to be extracted in accordance with a detection result of the image pickup state detection means, with a second specific frequency bands from among the predetermined frequency bands for focusing in accordance with the transmitted detection result of a lens state detection means for detecting a status of a lens unit, and selects one of the first specific frequency bands and the second specific frequency bands, which is lower than another.

9. An image pickup apparatus comprising:

the camera unit according to claim 8; and the lens unit having a focus lens unit.

* * * * *